(12) United States Patent
Muraoka

(10) Patent No.: US 8,935,070 B2
(45) Date of Patent: Jan. 13, 2015

(54) VEHICLE BRAKE PRESSURE CONTROLLER

(71) Applicant: Nissin Kogyo Co., Ltd., Nagano (JP)

(72) Inventor: Masashi Muraoka, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 64 days.

(21) Appl. No.: 13/853,143

(22) Filed: Mar. 29, 2013

(65) Prior Publication Data
US 2013/0261905 A1 Oct. 3, 2013

(30) Foreign Application Priority Data

Mar. 30, 2012 (JP) .................. 2012-079289

(51) Int. Cl.
*G06F 7/70* (2006.01)
*B60T 8/17* (2006.01)
*B60T 8/172* (2006.01)
*B60T 8/1755* (2006.01)

(52) U.S. Cl.
CPC . *B60T 8/17* (2013.01); *B60T 8/172* (2013.01); *B60T 8/17551* (2013.01)
USPC .............................................. 701/70; 701/50

(58) Field of Classification Search
CPC ........................................................ B60T 8/17
USPC ...................................................... 701/50, 70
See application file for complete search history.

(56) References Cited

U.S. PATENT DOCUMENTS

2012/0212043 A1* 8/2012 Miyata et al. ................ 303/9.62

FOREIGN PATENT DOCUMENTS

| JP | 2004506572 A | 3/2004 |
| JP | 2006056406 | 3/2006 |
| JP | 2007030784 A | 2/2007 |
| JP | 2007047081 A | 2/2007 |
| JP | 2009063471 A | 3/2009 |
| JP | 2011189900 A | 9/2011 |

OTHER PUBLICATIONS

Japaneese Office Action for rerated application No. 2012-079289, drafted Apr. 18, 2014, 5 pages.

* cited by examiner

*Primary Examiner* — Thomas G Black
*Assistant Examiner* — Luke Huynh
(74) *Attorney, Agent, or Firm* — Andrew M. Calderon; Roberts Mlotkowski Safran & Cole, P.C.

(57) ABSTRACT

In one embodiment, a vehicle brake pressure controller includes: a sensor and a control section. The sensor detects a dynamic characteristic quantity of a vehicle, and outputs it as first information. The control section includes: an input section configured to receive the first information; a conversion processing section configured to convert the first information into second information having a standardized format; and a correction processing section configured to correct the second information into third information, depending on the vehicle. Hence, the control section performs a brake pressure control based on the third information.

16 Claims, 4 Drawing Sheets

VEHICLE BRAKE PRESSURE CONTROLLER

CROSS-REFERENCE TO RELATED APPLICATION(S)

This application claims priority (priorities) from Japanese Patent Application No. 2012-079289 filed on Mar. 30, 2012, the entire contents of which are incorporated herein by reference.

FIELD

The present invention relates to a vehicle brake pressure controller, more particularly, to a vehicle brake pressure controller for controlling brake pressure on the basis of the output values of a sensor for detecting the dynamic characteristic quantities of a vehicle.

BACKGROUND

JP-2006-056406-A discloses a vehicle brake pressure controller equipped with a sensor, such as an acceleration sensor for detecting the dynamic characteristic quantities of a vehicle. The vehicle brake pressure controller is mounted on the circuit board of the controller. The output values obtained from this kind of sensor change in the magnitude and sign (plus/minus) of the values depending on the posture of the sensor installed in the vehicle. For this reason, it is necessary to convert the values output from the sensor inside the vehicle brake pressure controller to obtain dynamic characteristic quantities suited for the front-rear direction and the left-right direction of the vehicle in which the controller is installed.

In the vehicle brake pressure controller, the sensor may be changed to improve specifications or to reduce cost. On the other hand, the same type of vehicle brake pressure controllers may be installed in plural types of vehicles.

In the case that the sensor is changed, the old sensor may be different from the new sensor in the direction of installation with respect to the circuit board, in output method or in output characteristics, for example. Hence, as the sensor is changed, the output values thereof are required to be converted so as to match the specifications of the controller. Furthermore, in the case that the vehicle brake pressure controller is installed in a different type of vehicle, the installation posture of the controller, for example, may be changed. Also in this case, the output values of the sensor are required to be converted.

Conventionally, both in the case that only the sensor is changed and in the case that only the type of vehicle is changed, the entire conversion processing is required to be reexamined in consideration of both the output characteristics of the sensor and the characteristics of the vehicle so that the output values of the sensor are converted into output values suited for the vehicle.

SUMMARY

An aspect of the present invention provides a vehicle brake pressure controller including:
a sensor configured to detect a dynamic characteristic quantity of a vehicle and to output the dynamic characteristic quantity as first information; and
a control section including:
an input section configured to receive the first information from the sensor;
a conversion processing section configured to convert the first information into second information having a standardized format; and
a correction processing section configured to correct the second information into third information, depending on the vehicle,
wherein the control section performs a brake pressure control based on the third information.

With this configuration, the information output from the sensor is not subjected to conversion processing as a whole depending on the characteristics of the sensor and the characteristics of the vehicle, but the conversion processing section outputs the information in the standardized format and the correction processing section corrects the information depending on the vehicle, independently of the conversion processing section. For example, in the case that the sensor is changed to improve specifications or to reduce cost, while the conversion processing section may be changed so as to convert the information input from a new sensor into a predetermined standardized format, the correction processing section is not required to be changed. On the other hand, in the case that the type of vehicle in which the controller is installed is changed, while the correction processing section may be changed depending on the method for installing the controller in a new vehicle and the characteristics of the new vehicle, the conversion processing section is not required to be changed. Hence, it is possible to easily cope with the changes in the sensor and in the type of vehicle in which the controller is installed.

The terms "conversion" and "correction" may not be strictly distinguished from each other, but some sort of adjustment processing for information is referred to as conversion or correction.

There may be further provided the vehicle brake pressure controller,
wherein the conversion processing section converts the first information into the second information, depending on a posture of the sensor with respect to the vehicle brake pressure controller, and
wherein the correction processing section corrects the second information into the third information, depending on a posture of the vehicle brake pressure controller with respect to the vehicle.

With this configuration, the posture of the sensor with respect to the vehicle brake pressure controller and the posture of the vehicle brake pressure controller with respect to the vehicle are considered separately by the conversion processing section and the correction processing section, respectively, and the information is converted or corrected. Hence, in the case that the sensor or the type of vehicle is changed, the change in the conversion or the correction with respect to the posture of the sensor can be carried out easily.

There may be further provided the vehicle brake pressure controller,
wherein the conversion processing section includes a first filter configured to perform a first signal characteristic conversion on the first information, and
wherein the correction processing section includes a second filter configured to perform a second signal characteristic conversion on the second information.

With this configuration, a signal (information) is converted into the standardized format by the first filter depending on the signal characteristics of the sensor and corrected by the second filter depending on the characteristics of the vehicle. Hence, the conversion of the signal characteristics can be carried out easily.

The present invention can easily cope with changes in the sensor and in the type of vehicle in which the controller is installed.

DETAILED DESCRIPTION

An embodiment will be described referring to the accompanying drawings.

Figure 1:
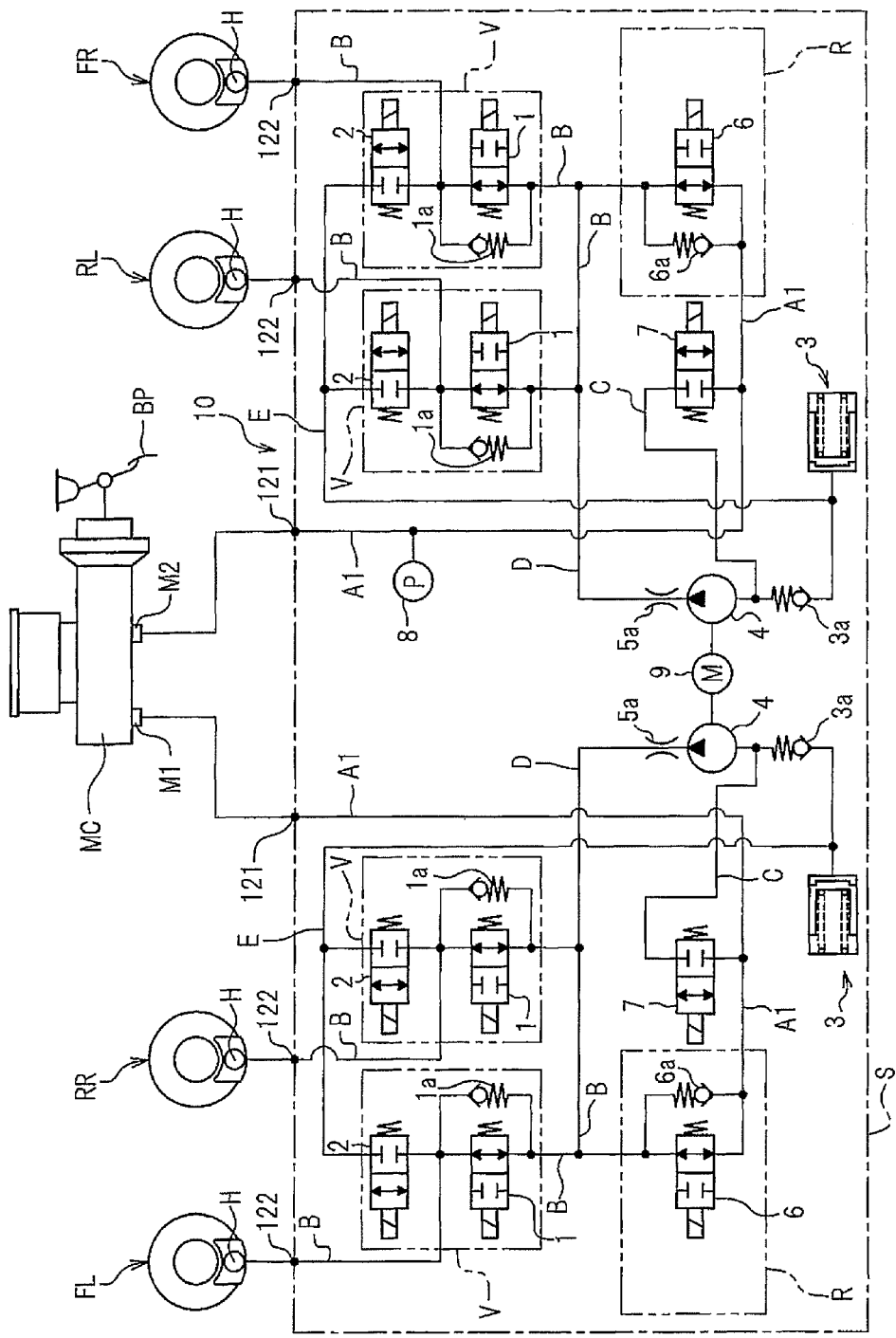
FIG. 1 shows a hydraulic circuit of a vehicle brake pressure controller.

As shown in FIG. 1, a vehicle brake hydraulic pressure controller (hydraulic pressure controller) S is disposed between a master cylinder MC for generating brake hydraulic pressure depending on the depressing force applied to a brake pedal BP and wheel brakes FL, RR, RL and FR. Communication is usually established from inlet ports 121 to outlet ports 122 via hydraulic passages inside the hydraulic pressure controller S, whereby the depressing force applied to the brake pedal BP is transmitted to each of the wheel brakes FL, RR, RL and FR.

In the hydraulic pressure controller S, two control valve units V and V respectively corresponding to the wheel brakes FL and RR are provided in the hydraulic passage (first system) starting from the output port M1 of the master cylinder MC. Similarly, two control valve units V and V respectively corresponding to the wheel brakes RL and FR are provided in the hydraulic passage (second system) starting from the output port M2 of the master cylinder MC. Each of the first and second systems of the hydraulic pressure controller S includes a reservoir 3, a pump 4, an orifice 5a, a regulation valve unit R and a suction valve 7. The hydraulic pressure controller S includes a common electric motor 9 for driving the pump 4 of the first system and the pump 4 of the second system. In the embodiment, a pressure sensor 8 is provided only in the second system.

In the following description, the hydraulic passage from the output port M1 of the master cylinder MC to the regulation valve unit R and the hydraulic passage from the output port M2 thereof to the regulation valve unit R are each referred to as an "output hydraulic passage A1." The hydraulic passage from the regulation valve unit R of the first system to the wheel brakes FL and RR and the hydraulic passage from the regulation valve unit R of the second system to the wheel brakes RL and FR are each referred to as a "wheel hydraulic passage B." The hydraulic passage from the output hydraulic passage A1 to the pump 4 is referred to as a "suction hydraulic passage C" and the hydraulic passage from the pump 4 to the wheel hydraulic passage 13 is referred to as a "discharge hydraulic passage D." The hydraulic passage from the wheel hydraulic passage 13 to the suction hydraulic passage C is referred to as an "open passage E."

The control valve unit V performs switching among three states, i.e., a state in which the open passage E is shut off while the wheel hydraulic passage B is opened, a state in which the open passage E is opened while the wheel hydraulic passage B is shut off, and a state in which the open passage E is shut off while the wheel hydraulic passage B is shut off. The control valve unit V includes an inlet valve 1 composed of a normally-open solenoid valve, an outlet valve 2 composed of a normally-closed solenoid valve, and a check valve 1a.

The reservoir 3 absorbs the brake fluid that is relieved when each outlet valve 2 is opened. A check valve 3a is provided between the reservoir 3 and the pump 4 to allow the brake fluid to flow only from the reservoir 3 to the pump 4.

The pump 4 performs sucking the brake fluid reserved in the reservoir 3 and discharging the brake fluid to the discharge hydraulic passage D. Thus, the pressure in the output hydraulic passage A1 and the pressure in the wheel hydraulic passage B, having been reduced when the brake fluid is absorbed by the reservoir 3, are recovered. The pump 4 also performs sucking the brake fluid retained in the master cylinder MC, the output hydraulic passage A1 and the suction hydraulic passage C and discharging the brake fluid to the discharge hydraulic passage D when a cut valve 6 described later shuts off the flow of the brake fluid from the output hydraulic passage A1 to the wheel hydraulic passage B and when the suction valve 7 opens the suction hydraulic passage C. Thus, the brake hydraulic pressure can be exerted to the wheel brakes FL, RR, RL and FR at the time of no operation of the brake pedal.

The orifice 5a is provided to attenuate the pulsation of the pressure of the brake fluid discharged from the pump 4.

The regulation valve unit R performs switching between two states, i.e., a state in which the brake fluid is allowed to flow from the output hydraulic passage A1 to the wheel hydraulic passage B and a state in which the flow of the brake fluid is shut off. The regulation valve unit R also performs adjusting the brake hydraulic pressure in the wheel hydraulic passage B and the discharge hydraulic passage D to a preset value or less when the flow of the brake fluid from the output hydraulic passage A1 to the wheel hydraulic passage B is shut off. The regulation valve unit R includes the cut valve 6 composed of a normally-open solenoid valve and a check valve 6a.

The suction valve 7 is a normally-closed solenoid valve and is used to switch the suction hydraulic passage C to an open state or to a closed state. The suction valve 7 is opened (valve opening) by a control section 100 shown in FIG. 6 when the flow of the brake fluid from the output hydraulic passage A1 to the wheel hydraulic passage B is shut off at the time of no operation of the brake pedal, in other words, when the brake hydraulic pressure is exerted to each of the wheel brakes FL, RR, RL and FR at the time of no operation of the brake pedal The pressure sensor 8 is used to measure the brake hydraulic pressure in the output hydraulic passage A1, and the result of the measurement is input to the control section 100 as necessary.

The basic operation of the above-mentioned hydraulic pressure controller S will be described briefly. During normal braking time (during normal time) in which each wheel is unlikely to be locked, the regulation valve unit R is in a state of allowing the brake fluid to flow from the output hydraulic passage A1 to the wheel hydraulic passage B, the suction valve 7 is in a state of shutting off the suction hydraulic passage C, and the control valve unit V is in a state of opening the wheel hydraulic passage B and shutting off the open passage E. In other words, the brake hydraulic pressure generated due to the depressing force applied to the brake pedal BP is directly exerted to the wheel brakes FL, RR, RL and FR.

If the wheels are likely to be locked while the brake pedal BP is depressed, anti-lock braking control is started by the control section 100. In the case that the brake hydraulic pressure exerted to the wheel brakes FL, RR, RL and FR is reduced, the inlet valves 1 are energized by the control section 100 so as to be closed (valve closing) and the outlet valves 2 are energized so as to be opened (valve opening). Hence, the brake fluid in the wheel hydraulic passages B communicating with the wheel brakes FL, RR, RL and FR flows into the reservoirs 3 through the open passages E. As a result, the brake hydraulic pressure exerted to the wheel brakes FL, RR, RL and FR is reduced.

In the case that the brake hydraulic pressure exerted to the wheel brakes FL, RR, RL and FR is held constant, the inlet valves 1 are energized by the control section 100 so as to be closed (valve closing) and the energization of the outlet valves 2 is stopped and the outlet valves 2 are closed (valve closing). Hence, the brake fluid is trapped inside the brake hydraulic passages closed by the wheel brakes FL, RR, RL and FR, the inlet valves 1 and the outlet valves 2. As a result, the brake hydraulic pressure exerted to the wheel brakes FL, RR, RL and FR is held constant.

In the case that the brake hydraulic pressure exerted to the wheel brakes FL, RR, RL and FR is raised, the energization of the inlet valves 1 is stopped and the inlet valves 1 are opened (valve opening) and the energization of the outlet valves 2 is stopped and the outlet valves 2 are closed (valve closing) by the control section 100. Hence, the brake hydraulic pressure generated due to the depressing force applied to the brake pedal BP is directly exerted to the wheel brakes FL, RR, RL and FR. As a result, the brake hydraulic pressure exerted to the wheel brakes FL, RR, RL and FR is raised.

During the anti-lock braking control, the electric motor 9 is driven and the pumps 4 are operated by the motor. Hence, the brake fluid reserved in the reservoirs 3 is returned by the pumps 4 to the wheel hydraulic passages B via the discharge hydraulic passages D.

At the time of no operation of the brake pedal, skid control and traction control are started depending on the state of the vehicle. At the time of no operation of the brake pedal, for example, in the case that the left front wheel is braked, the cut valves 6 are energized by the control section 100 so as to be closed (valve closing) and the suction valves 7 are energized so as to be opened (valve opening). The inlet valves 1 in the control valve units V other than the control valve unit V corresponding to the wheel desired to be braked are energized so as to be closed (valve closing). In this state, the electric motor 9 is driven to operate the pumps 4. Hence, the brake fluid reserved in the master cylinder MC and the reservoirs 3 is discharged from the pumps 4 to the discharge hydraulic passages D. Since the cut valves 6 are closed and the inlet valve 1 leading to the wheel brake FL is opened, the brake fluid supplied to the discharge hydraulic passages D flows into only the wheel hydraulic passage B leading to the wheel brake FL. As a result, the brake hydraulic pressure is exerted to the wheel brake FL and the left front wheel is braked.

Figure 2:
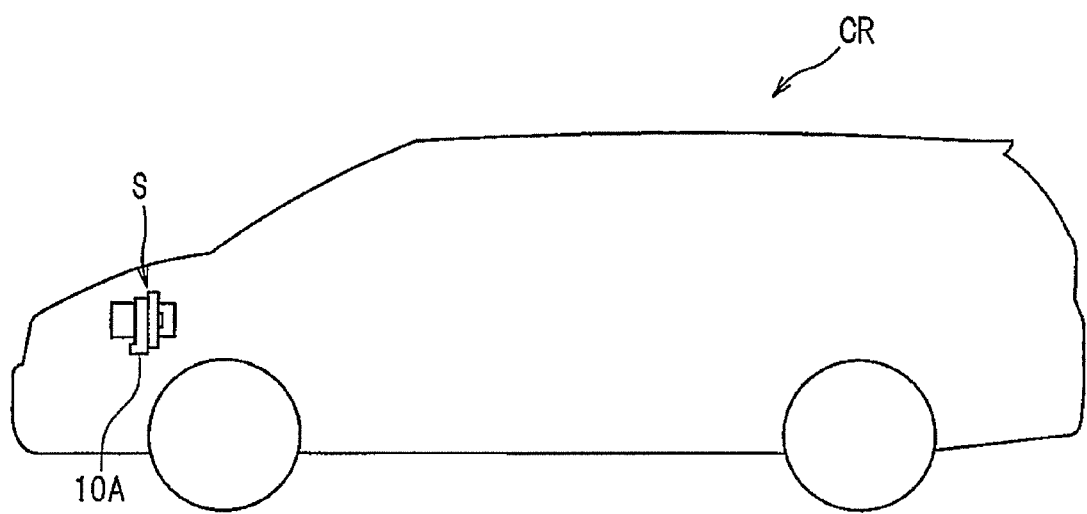
FIG. 2 shows a vehicle equipped with the vehicle brake pressure controller from a side.
Figure 3:
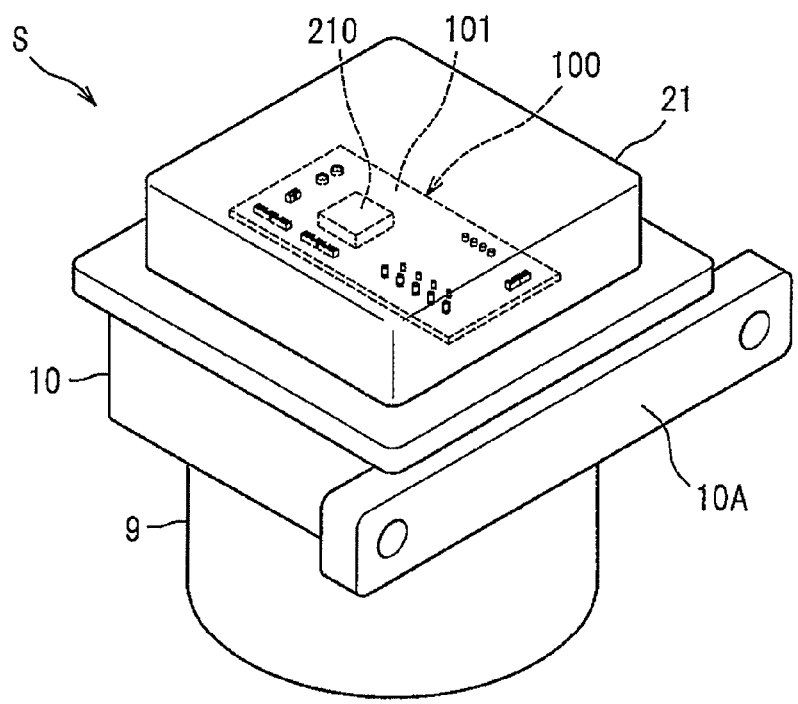
FIG. 3 perspectively shows an example of the vehicle brake pressure controller.

The above-described hydraulic pressure controller S is disposed at a predetermined position in a vehicle CR, for example, inside the bonnet thereof, as shown in FIG. 2. FIG. 3 shows an example external appearance of the hydraulic pressure controller S. As shown in FIG. 3, the hydraulic pressure controller S includes a hydraulic unit 10. The hydraulic unit 10 is made of an aluminum block and has hydraulic passages therein. For example, the electric motor 9 is secured to the lower part of the hydraulic unit 10, and solenoid valves (not shown) are inserted into the upper part of the hydraulic unit 10. A plastic cover 21 is disposed to cover these solenoid valves. The control section 100 for controlling the solenoid valves is disposed inside the cover 21. On a side face of the hydraulic unit 10 functions as an installation face (reference face) 10A of the hydraulic pressure controller S when it is installed in the vehicle CR. In the example of FIG. 2, when the hydraulic pressure controller S is installed in the vehicle CR, the installation face 10A is oriented downward.

Coils (not shown) for energizing the solenoid valves and a sensor 210 are disposed on the circuit board 101 of the control section 100. The sensor 210 detects the dynamic characteristic quantities of the vehicle. In the embodiment, the sensor 210 is configured to detect acceleration and yaw rate, for example.

Figure 4A:
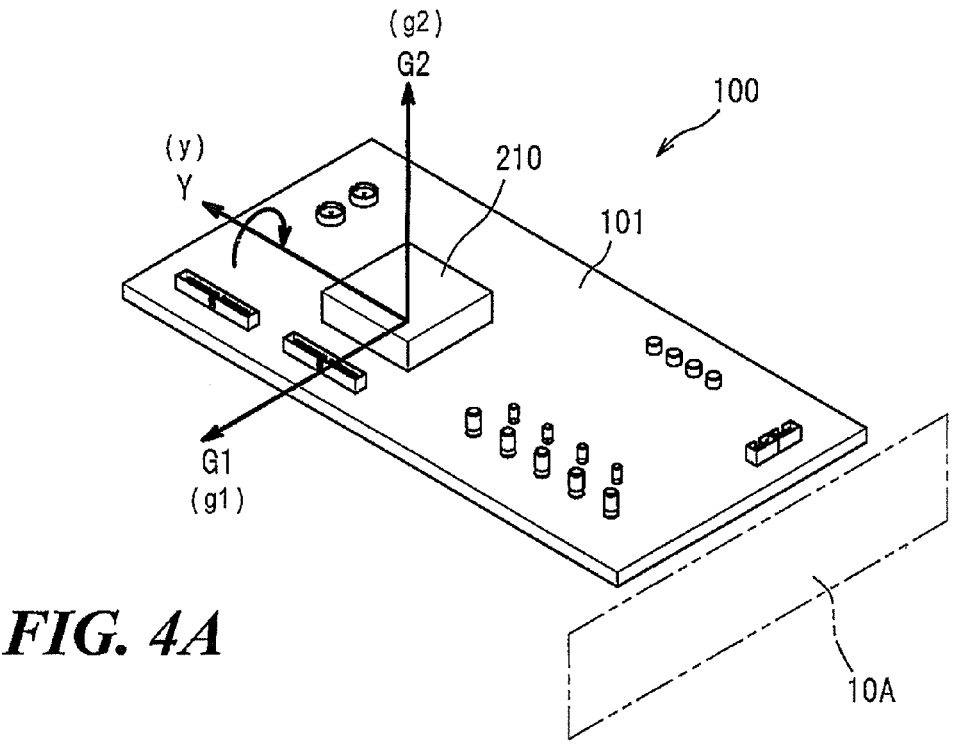
FIG. 4A shows a first example of mounting a sensor on a circuit board.

In an example of FIG. 4A, the sensor 210 capable of detecting two accelerations G1 and G2 and a yaw rate Y is mounted on a face of the circuit board 101. The acceleration G1 is defined in parallel with the face of the circuit board 101, and the acceleration G2 is defined perpendicularly to the face of the circuit board 101. For example, the acceleration G1 is defined correspondingly with a forward direction in FIG. 4A in a lateral axis (an axis perpendicular to a longitudinal axis) of the circuit board 101, and the acceleration G2 is defined correspondingly with an upward direction in FIG. 4A in a vertical axis (an axis perpendicular to the lateral axis and the longitudinal axis) of the circuit board 101. Further, the yaw rate Y is defined around the longitudinal axis of the circuit board 101, such that a clockwise direction in FIG. 4A is positive.

Figure 4B:
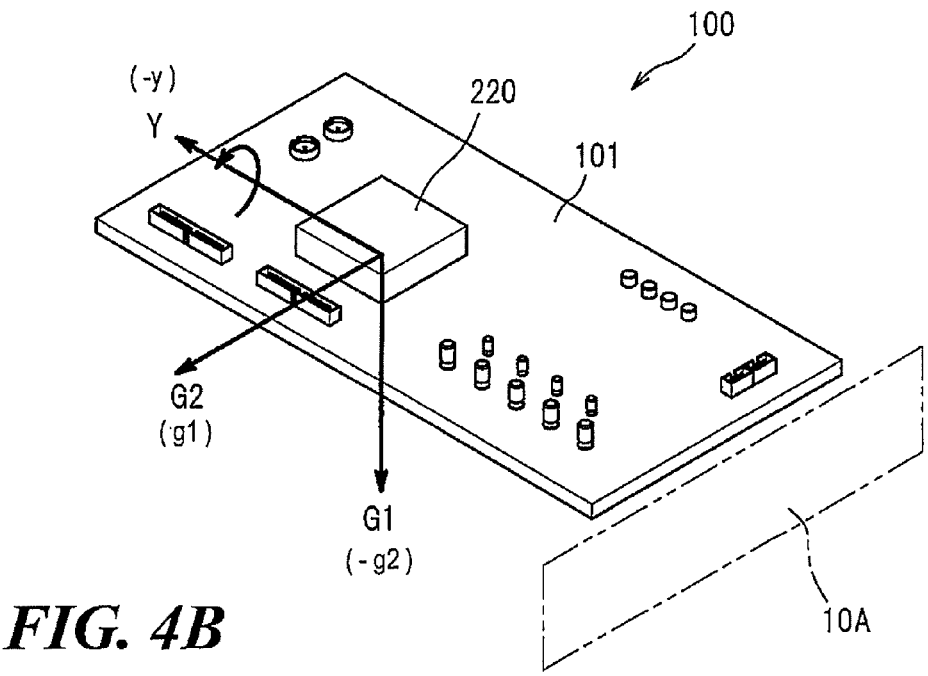
FIG. 4B shows a second example of mounting the sensor on the circuit board.

Here, in the control section 100, the sensor may be changed in order to improve specifications or to reduce cost, for example. FIG. 4B shows an example of mounting a sensor 220 on the circuit board 101 instead of the sensor 210.

In the example of FIG. 4B, although the sensor 220 is also capable of detecting two accelerations G1 and G2 and a yaw rate Y, directions thereof are different from those in the case of the sensor 210. The acceleration G1 is defined correspondingly with a downward direction in FIG. 4B in the vertical axis of the circuit board 101, and the acceleration G2 is defined correspondingly with a forward direction in FIG. 4B in the lateral axis of the circuit board 101. Further, the yaw rate Y is defined around the longitudinal axis of the circuit board 101, such that a counterclockwise direction in FIG. 4B is positive.

In addition to the change of the sensor to be provided in the hydraulic pressure controller S, the installation posture (a posture with respect to the front-rear direction and the left-right direction of the vehicle) of the hydraulic pressure controller S will be changed depending on the type of vehicle. For example, in FIGS. 2 and 5, although the installation face 10A is mounted so as to be aligned with a predetermined installation face (not shown) in the vehicle CR, when the orientation of the vehicle's installation face and the arrangement of bolt holes are changed, the directions and the magnitudes of the accelerations G1 and G2 detected by the sensor 210/220 are also changed.

Figure 6:
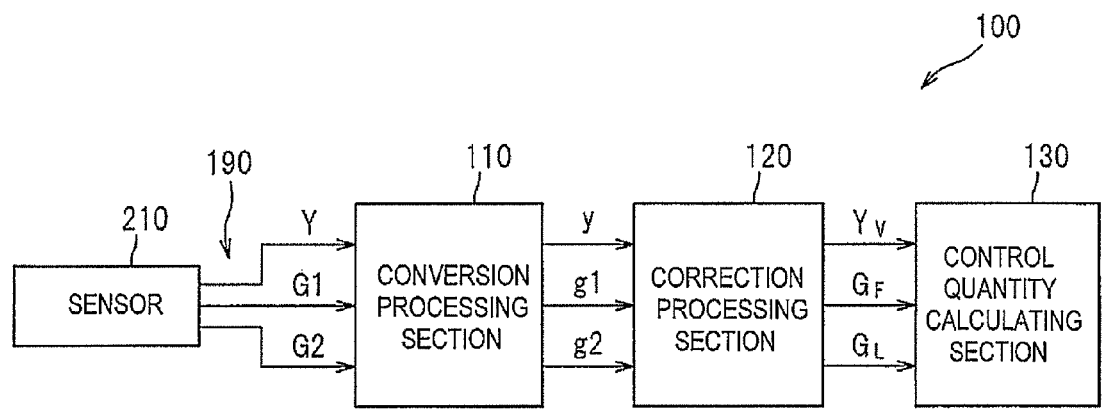
FIG. 6 shows a functional configuration of the vehicle brake pressure controller.

In order to easily cope with the change of the specifications of the sensor and the change of the type of vehicle (the installation posture of the hydraulic pressure controller S), the control section 100 has a configuration for converting the dynamic characteristic quantities into appropriate values, as shown in FIG. 6.

The control section 100 receives the dynamic characteristic quantities detected by the sensor 210, determines a control quantity depending on the dynamic characteristic quantities, and drives the electric motor 9 and the respective solenoid valves, thereby generating brake pressure. The control section 100 has an input section 190 (an interface on the circuit) for receiving information output from the sensor 210, a conversion processing section 110, a correction processing section 120 and a control quantity calculating section 130.

The conversion processing section 110 converts the information input from the input section 190 into a standardized format. In the embodiment, the information includes the dynamic characteristic, such as the accelerations G1 and G2 and yaw rate Y. The standardized format in the embodiment means that the directions (positive and negative directions) of the dynamic characteristic quantities are aligned with specific directions with respect to the installation face 10A. For example, when it is assumed that a format in which the accelerations G1 and G2 and the yaw rate Y are obtained in the directions shown in FIG. 4A is a standard format (standardized format), the accelerations g1 and g2 and the yaw rate y to be output from the conversion processing section 110 have the same values as those having been input thereto, as described below:

$g1=G1$ $g2=G2$ $y=Y$

In the case that the sensor 220 shown in FIG. 4B is used, in order that the values are output in the same directions with respect to the installation face 10A, the configuration of the conversion processing section 110 is changed so as to convert input values (the accelerations G1 and G2 and the yaw rate Y) as described below:

$g1=G2$ $g2=-G1$ $y=-Y$

Figure 5:
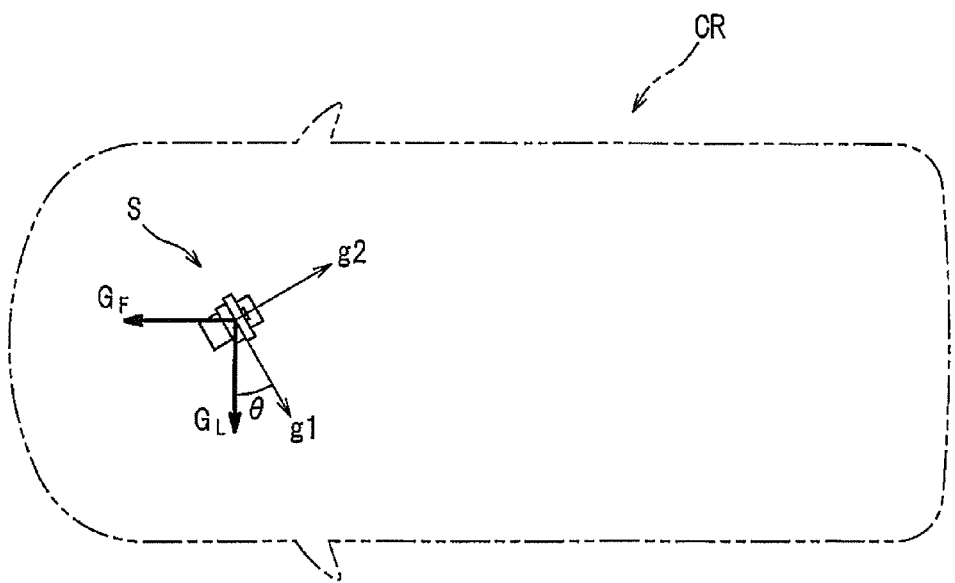
FIG. 5 shows a vehicle equipped with the vehicle brake pressure controller from above.

The correction processing section 120 corrects the information converted into the format standardized by the conversion processing section 110 so as to be suited for the type of vehicle. In the embodiment, the correction processing section 120 converts (corrects) the dynamic characteristic quantities input from the conversion processing section 110 so that the quantities have appropriate directions and magnitude depending on the posture at the time when the hydraulic pressure controller S is installed in the vehicle. A case in which the axis of the yaw rate is oriented in the vertical direction as shown in FIG. 5 is herein described for simplicity. In the example of FIG. 5, the direction of the acceleration g1 being output in a direction perpendicular to the installation face 10A is inclined by an angle θ with respect to the left direction of the vehicle. In this case, the acceleration $G_F$ in the front-rear direction of the vehicle, being positive in the forward direction of the vehicle, can be calculated by:

$G_F = -g1 \cdot \sin\theta - g2 \cdot \cos\theta$ and the lateral acceleration $G_L$, being positive in the leftward direction, can be calculated by:

$G_L = g1 \cdot \cos\theta - g2 \cdot \sin\theta$

In the case that the value of θ is changed depending on the type of vehicle in which the hydraulic pressure controller S is installed, it is possible to cope with the change by changing the angle θ in the above expressions. In a specific type of vehicle, the angle θ may be a constant.

In the embodiment, the yaw rate is not required to be corrected depending on the angle θ. Hence, the value of the yaw rate y may be used directly as the yaw rate $Y_v$ after the correction. In other words, it is assumed that $Y_v=y$.

The control quantity calculating section 130 calculates brake pressure to be exerted on the basis of the dynamic characteristic quantities output from the correction processing section 120, and known means can be used. The control quantity is, for example, brake pressure in the case of anti-lock braking control for suppressing wheel locking by mainly using the vehicle speed, the wheel speed and the acceleration $G_F$ in the front-rear direction or brake pressure in the case of vehicle stabilizing control for exerting a brake force to some of the wheels so as to eliminate the deviation between the yaw rate estimated from the steering angle and the measured yaw rate.

The control quantity calculating section 130 determines the brake pressure exerted to the wheel brakes FL, RR, RL and FR. The wheel brakes FL, RR, RL and FR are driven by the hydraulic unit 10 according to this control quantity, whereby the anti-lock braking control and the vehicle stabilizing control are realized.

With the above-described hydraulic pressure controller S, the accelerations G1 and G2 and the yaw rate Y input from the sensor and used as raw information are not directly converted into quantities (with respect to direction and magnitude) suited for the vehicle CR, but converted once into the standardized format by the conversion processing section 110. If the sensor is changed, it is possible to cope with the change in the sensor by changing the conversion processing performed by the conversion processing section 110 without changing the correction processing section 120. On the other hand, in the case that the type of vehicle in which the hydraulic pressure controller S is installed is changed, it is also possible to cope with the change in the type of vehicle by performing conversion processing (correction processing) depending on the posture of the hydraulic pressure controller S installed in the vehicle CR. Hence, with the hydraulic pressure controller S according to the embodiment, it is possible to easily cope with the changes in the sensor and the type of vehicle in which the controller is installed.

Although the embodiment according to the present invention has been described above, the present invention is not limited to the embodiment, but can be modified as appropriate in various ways.

Figure 7:
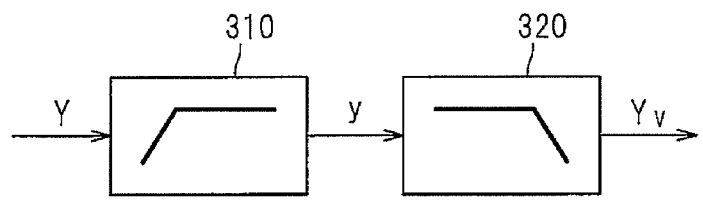
FIG. 7 shows an example of a signal conversion performed using a first filter and a second filter.

For example, in the above-mentioned embodiment, the information to be processed by the conversion processing section 110 is the actual values of the accelerations and the yaw rate being used as examples of the dynamic characteristic quantities. However, it may be possible to use signals derived in consideration of the change in the dynamic characteristic quantities with time. In this case, as shown in FIG. 7, the conversion processing section 110 may have a first filter 310 for converting the signal characteristics of the sensor 210 into specific signal characteristics, and the correction processing section 120 may have a second filter 320 for converting the characteristics of the signals output from the conversion processing section 110 into the signal characteristics suited for the vehicle CR.

The first filter 310 is herein, for example, a filter determined depending on the magnitude (sensitivity) of the output values and the noise characteristics of a specific type of sensor, such as the sensor 210 or the sensor 220. For example, as shown in FIG. 7, when the yaw rate Y is filtered by the first filter 310, a yaw rate y is obtained as a signal having characteristics from which high frequency components higher than a specific frequency are eliminated, for example. The second filter 320 is, for example, a filter for eliminating noise depending on the vibration characteristics of a bracket that is used to install the hydraulic pressure controller S in the vehicle CR. When the yaw rate y output from the conversion processing section 110 is filtered by the second filter 320, a yaw rate $Y_v$ having signal characteristics suited for use in the control quantity calculating section 130 can be obtained.

With this configuration, a signal (information) is converted into the standardized format by the first filter 310 depending on the signal characteristics of the sensor and further converted by the second filter 320 depending on the characteristics of the vehicle CR. For this reason, in the case that the sensor is changed, only the first filter 310 may be changed. In the case that the type of vehicle in which the controller is installed is changed, only the second filter 320 may be changed. Hence, in the case that the sensor is changed or the type of vehicle is changed, the conversion of the signal characteristics can be carried out easily.

Although the case of using hydraulic pressure for exerting brake pressure is exemplified in the above-mentioned embodiment, pressure other than hydraulic pressure may be used to exert brake pressure.

The invention claimed is:

1. A vehicle brake pressure controller comprising:
   a sensor configured to detect a dynamic characteristic quantity of a vehicle and to output the dynamic characteristic quantity as first information; and
   a control section comprising:
   an input section configured to receive the first information from the sensor;
   a conversion processing section configured to convert the first information into second information having a standardized format; and
   a correction processing section configured to correct the second information into third information, depending on the vehicle,
   wherein the control section performs a brake pressure control based on the third information.

2. The vehicle brake pressure controller of claim 1,
   wherein the conversion processing section converts the first information into the second information, depending on a posture of the sensor with respect to the vehicle brake pressure controller, and
   wherein the correction processing section corrects the second information into the third information, depending on a posture of the vehicle brake pressure controller with respect to the vehicle.

3. The vehicle brake pressure controller of claim 1,
   wherein the conversion processing section includes a first filter configured to perform a first signal characteristic conversion on the first information, and
   wherein the correction processing section includes a second filter configured to perform a second signal characteristic conversion on the second information.

4. The vehicle brake pressure controller of claim 1, wherein the first information output from the sensor is not subjected to conversion processing as a whole depending on characteristics of the sensor and characteristics of the vehicle.

5. The vehicle brake pressure controller of claim 4, wherein the conversion processing section outputs the second information in the standardized format and the correction processing section corrects the second information into third information, independently of the conversion processing section.

6. The vehicle brake pressure controller of claim 5, wherein in a case that the sensor is changed, the conversion processing section is changed so as to convert the first information input from a new sensor into a predetermined standardized format, the correction processing section is not required to be changed.

7. The vehicle brake pressure controller of claim 5, wherein in a case that a type of vehicle in which the controller is installed is changed, the correction processing section is changed depending on a method for installing the controller in a new vehicle and characteristics of the new vehicle, the conversion processing section is not required to be changed.

8. The vehicle brake pressure controller of claim 2, wherein the posture of the sensor with respect to the vehicle brake pressure controller and the posture of the vehicle brake pressure controller with respect to the vehicle are considered separately by the conversion processing section and the correction processing section, respectively.

9. The vehicle brake pressure controller of claim 2, wherein a signal comprising the first information is converted into the standardized format by a first filter depending on signal characteristics of the sensor and corrected by a second filter depending on characteristics of the vehicle.

10. The vehicle brake pressure controller of claim 1, wherein the dynamic characteristic quantity comprises accelerations G1 and G2 and a yaw rate Y, wherein the accelerations G1 and G2 and yaw rate Y are defined with relationship to a circuit board in which the sensor is mounted thereto.

11. The vehicle brake pressure controller of claim 1, wherein the standardized format means that positive and negative directions of the dynamic characteristic quantities are aligned with specific directions with respect to an installation face of the sensor.

12. The vehicle brake pressure controller of claim 1, wherein the correction processing section corrects the information converted into the format standardized by the conversion processing section so as to be suited for a type of vehicle.

13. The vehicle brake pressure controller of claim 1, further comprising a control quantity calculating section which calculates brake pressure to be exerted on a basis of the third information comprising dynamic characteristic quantities output from the correction processing section.

14. The vehicle brake pressure controller of claim 1, wherein accelerations G1 and G2 and yaw rate Y input from the sensor and used as raw information are converted into the standardized format and not directly converted into quantities with respect to direction and magnitude.

15. The vehicle brake pressure controller of claim 1, wherein the conversion processing section has a first filter for converting signal characteristics of the sensor into specific signal characteristics, and the correction processing section has a second filter for converting the characteristics of the signals output from the conversion processing section into the signal characteristics suited for a specific vehicle.

16. The vehicle brake pressure controller of claim 15,
   wherein the first filter is a filter determined depending on magnitude of output values and noise characteristics of a specific type of sensor, and
   wherein the second filter is a filter for eliminating noise depending on vibration characteristics of a bracket that is used to install a hydraulic pressure controller in the vehicle.

* * * * *